United States Patent [19]

Jenkner et al.

[11] 4,376,837
[45] Mar. 15, 1983

[54] FLAME RETARDANT TETRABROMOPHTHALIC ACID ESTERS USEFUL IN SYNTHETIC RESINS

[75] Inventors: Herbert Jenkner, Pulheim; Robert Strang, Cologne, both of Fed. Rep. of Germany

[73] Assignee: Chemische Fabrik Kalk GmbH, Cologne, Fed. Rep. of Germany

[21] Appl. No.: 301,849

[22] Filed: Sep. 14, 1981

[30] Foreign Application Priority Data

Sep. 13, 1980 [DE] Fed. Rep. of Germany ....... 3034634

[51] Int. Cl.$^3$ ................. C08K 5/15; C07D 32/00; C07C 69/80; C08K 5/12
[52] U.S. Cl. ................. 524/108; 524/288; 549/267; 560/83
[58] Field of Search ............. 260/45.85 T, 45.85 R, 260/340.2, 31.8 HA, 45.7 RL; 560/83, 85, 106; 528/271; 524/108, 288; 549/267

[56] References Cited

U.S. PATENT DOCUMENTS

| | | | |
|---|---|---|---|
| 3,281,456 | 10/1966 | Renckhoff et al. | 560/85 |
| 3,483,247 | 12/1969 | Mills et al. | 560/85 |
| 3,635,850 | 1/1972 | Birkner et al. | 260/45.7 RL |
| 3,658,634 | 4/1972 | Yanagi et al. | 260/45.7 RL |
| 3,772,342 | 11/1973 | Foley | 260/45.85 T |
| 3,966,676 | 6/1976 | Richter et al. | 260/45.85 T |

FOREIGN PATENT DOCUMENTS 577655  6/1959  Canada ......................... 560/83
48-43393 12/1973 Japan .

OTHER PUBLICATIONS

Meyers et al., *Berichte*, vol. 30, 780, (1897).

*Primary Examiner*—V. P. Hoke
*Attorney, Agent, or Firm*—Millen & White

[57] ABSTRACT

Tetrabromophthalic acid esters of pentabromobenzyl alcohol with a softening temperature of 270°–280° C. and a bromine content of about 75% by weight and of a tetrakis(bromomethyl)-o-xylylene glycol with a softening temperature of 220°–230° C. and a bromine content of about 67% by weight are good flame retardants for synthetic resins.

7 Claims, No Drawings

FLAME RETARDANT TETRABROMOPHTHALIC ACID ESTERS USEFUL IN SYNTHETIC RESINS

BACKGROUND OF THE INVENTION

This invention relates to new flame retardants for synthetic resins.

Special properties are required of flame retardants to be incorporated into thermoplastic synthetic resins. They must not be subject to thermal decomposition at the high processing temperatures used with the thermoplastic synthetic resins. Also, they must not bleed out of the thermoplastic synthetic resins into which they have been incorporated.

Various flame retardants, such as, for example, highly brominated biphenyls or highly brominated diphenyl ethers, tend to bleed out if they are exposed to extreme weathering conditions. These flame retardants tend to migrate to the surface when they are exposed, for example, while being incorporated into a synthetic resin, to the so-called tropic test, i.e., 14-days storage at 50° C. and a relative atmospheric humidity of 100%. Not only do they thereby produce an undesirable surface coating but the intended flame-retarding effect is likewise reduced to a corresponding extent.

The problem thus exists to find suitable flame retardants for thermoplastic synthetic resins in whose use the above-mentioned undesirable properties do not occur.

SUMMARY OF THE INVENTION

Accordingly, it is an object of this invention to provide flame retardants which are suitable for use with synthetic resins and which, preferably, avoid or minimize the above-mentioned difficulties.

Upon further study of the specification and appended claims, further objects and advantages of this invention will become apparent to those skilled in the art.

These objects have been attained by providing tetrabromophthalic acid esters of pentabromobenzyl alcohol having a softening temperature of 270°–280° C. and a bromine content of 73–77%, preferably 75–75.5%, most preferably about 75% by weight, and tetrabromophthalic acid esters of tetrakis(bromomethyl)-o-xylylene glycol having a softening temperature of 220°–230° C. and a bromine content of 62–68%, preferably 66–67%, most preferably about 67% by weight.

DETAILED DISCUSSION

The esters of this invention are finely divided (particulate), slightly colored products which decompose only at temperatures lying markedly above the upper limit of the respective softening temperature range.

These products can be manufactured by reacting tetrabromophthalic acid or tetrabromophthalic anhydride, in an inert polar solvent dissolving the reactants, preferably glycol monomethyl ether, but also solvents such as ethyleneglycol, diethyleneglycol or partial ethers of these.

In the presence of an alkali metal hydroxide, such as the hydroxide of Na, K etc., with a pentabromobenzyl halide, preferably pentabromobenzyl bromide, or with hexakis(bromomethyl)benzene, respectively, at a temperature of 60°–100° C. For the preparation of either class of ethers, the alcohols per se can be used for reaction with the acid component. Alternatively, halides of these alcohols can also be used in each case.

Generally, in order to prepare the products of this invention, an aqueous alkali metal hydroxide solution is dissolved, in a reaction vessel, in a polar solvent, e.g., glycol monomethyl ether. The alkali metal hydroxide content is higher by about 3–4% by weight than the weight of the reactants. The concentration of hydroxide in the solution generally is 0.5–5.0 weight %. The reactants are preferably employed in stoichiometric amounts, which correspond to a ratio of acid component to alcohol component of 1 to 2 mol of a monovalent alcohol or 1 mol of a divalent alcohol.

Tetrabromophthalic acid or anhydride is added in incremental portions to this solution, and the mixture is heated to about 60°–100° C. Thereafter, the pentabromobenzyl halide, hexakis(bromomethyl)benzene or other reactant is added in metered amounts under agitation. The reaction is conducted at this temperature during the course of several hours, generally 8–40 hours. For working up purposes, the solids are vacuum-filtered from the respectively cooled-down reaction mixtures, washed neutral and/or free of bromide with fresh solvent and thereafter with water, and dried. In each case, a mixture of esters is obtained. The mixture contains both monoesters and diesters and in the case of the xylylene glycol diesters, the same also include cyclic diesters. The precise percentage of bromine content obtained in each case will vary with the ratio of reactants and the precise reaction conditions employed. This relationship can be determined in each case by routine preliminary experiments.

The products of this invention are distinguished by good thermal stability. They have a decomposition point above 260° C. and are suitable as flame retardants for thermoplastic synthetic resins, especially for polyolefins and polystyrene, also in the form of ABS polymers. They are also suitable for use with standard polyesters in compact form or in the form of fibers or sheeting.

The thus-produced products of this invention are incorporated into the desired thermoplastic synthetic resin in fully conventional fashion including amounts and methodology. The amount of flame-retarding component incorporated is preferably 5–20% by weight, based on the weight of the final synthetic resin mixture ready for use. The precise amount added depends on the fire resistance to be achieved and on the type of synthetic resin. These flame retardants can be used in combination with conventional amounts of other known flame retardants.

The softening points mentioned in the specification are measured conventionally, e.g. using a heating system Kofler. In the examples, the term "melting point" is used interchangeably with "softening point".

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a reactor, 1,300 parts by weight of tetrabromophthalic acid anhydride is added under agitation during the course of 1 hour in incremental portions to a solution of 12,500 parts by weight of glycol monomethyl ether and 1,547 parts by weight of a 15% by weight sodium hydroxide solution, the mixture being heated up to 80° C. Then, 3,172 parts by weight of pentabromobenzyl bromide is added to this mixture; the reaction temperature is increased at the reflux condenser to 105° C., and during the course of 12 hours the reaction is completed, during which period the reaction product is being deposited as a finely divided solid from the reaction mixture. The reaction product is vacuum-filtered after cooling the reaction mixture to room temperature and washed with 2,000 parts by weight of glycol monomethyl ether. In order to remove any adhering sodium hydroxide or sodium bromide in its entirety, the filter cake is made into a slurry with 15,000 parts by weight of water, and then vacuum-filtered. After drying at 70°–100° C., 3,663 parts by weight of finely particulate, beige-colored tetrabromophthalic acid bis(pentabromobenzyl) esters is obtained. The yield corresponds to 90.1% of theory. The product has a Br content of 75.3% and melts at 270°–280° C.

EXAMPLE 2

In a reactor, 279 parts by weight of tetrabromophthalic acid anhydride is added under agitation to a solution of 2,900 parts by weight of glycol monomethyl ether and 335 parts by weight of a 15% strength sodium hydroxide solution, the reaction mixture being heated to 60° C. After 1 hour, 383 parts by weight of hexakis(bromomethyl)benzene is added thereto, and the mixture is maintained under stirring for 3 hours at this temperature. Thereafter the reaction temperature is raised to 80° C. and, during the course of 16 hours, the reaction is completed at this temperature. Working up takes place in the same way as described in Example 1. The yield is 385 parts by weight of finely particulate beige-colored tetrabromophthalic acid esters of tetrakis(bromomethyl)-o-xylylene glycol and corresponds to 66.9% of theory. The product has a Br content of 67.0% and a softening point of about 230° C.

The products of this invention, namely the tetrabromophthalic acid esters of pentabromobenzyl alcohol (I) and the tetrabromophthalic acid esters of tetrakis(bromomethyl)-o-xylylene glycol (II) are incorporated, together with antimony trioxide, into the following synthetic resins in a conventional fashion:
A into acrylonitrile-butadiene-styrene polymer (ABS)
B into impact-resistant polystyrene (HIPS)
C into polytetramethylene terephthalate (PTMT)
D into high-density polyethylene (HDPE)

These mixtures are used to make rods having a thickness of 1.6 mm and 3.2 mm for the flammability test according to UL 94; rods with a thickness of 4 mm for the flammability tests according to ASTM D 635-74 and according to ASTM D 2863-74 (oxygen index); and plates with a thickness of 1.5 mm for the bleeding-out tests.

The following describes the flammability test UL 94 of Underwriters' Laboratories, U.S.A.:

A specimen with a length of 127 mm and a width of 12.7 mm is clamped into a holder so that the longitudinal axis of the specimen extends vertically and its front edge is 9.5 mm above the flame tube of a bunsen burner. The burner is ignited away from the specimen; the non-luminous flame is adjusted to a height of 19 mm, and then the burner is placed underneath the center of the lower edge of the specimen. After 10 seconds, the burner is removed and the afterburning period and afterglow period of the specimen are measured. After complete extinction, the specimen is exposed to the flame a second time for 10 seconds, and the second afterburning and afterglowing times are determined.

Thereafter the specimen is graded by the following classification:

HB = The specimen continues to burn after removal of the flame.

V-0 = No afterburning period of, in total, more than 10 seconds; no afterglowing period of more than 30 seconds after the second flame exposure; no dripping of flaming particles igniting cotton wool placed therebeneath.

V-1 = No afterburning period of, in total, more than 50 seconds; no afterglowing period of more than 60 seconds after the second flame exposure; no dripping of flaming particles igniting cotton wool placed therebeneath.

V-2 = No afterburning period of, in total, more than 50 seconds; no afterglowing period of more than 60 seconds after the second flame exposure; specimen may drip flaming particles and ignite cotton wool placed therebeneath.

The results of the tests are compiled in the following table:

TABLE

|  | ABS (A) | | | HIPS (B) | | | PTMT (C) | | HDPE (D) | | |
|---|---|---|---|---|---|---|---|---|---|---|---|
| Composition in % | | | | | | | | | | | |
| Synthetic resin | 100 | 78.5 | 76.5 | 100 | 80.5 | 78.5 | 100 | 86 | 100 | 92 | 90 |
| Product I | — | 16.5 | — | — | 15.5 | — | — | 10 | — | — | — |
| Product II | — | — | 18.5 | — | — | 17.5 | — | — | — | — | 6.5 |
| Antimony trioxide | — | 5.0 | 5.0 | — | 4.0 | 4.0 | — | — | — | — | 3.5 |
| Flammability tests | | | | | | | | | | | |
| ASTM-D 635-74 Afterburning time, sec | 178 | 5 | 5 | 165 | 5 | 5 | — | — | 160 | 5 | 5 |
| ASTM-D 635-74 Max. burning length, mm | 100 | 14 | 13 | 100 | 12 | 12 | — | — | 100 | 16 | 19 |
| ASTM-D 2863-74 Oxygen % | 18.5 | — | — | 17.5 | — | — | — | — | 16.5 | — | — |
| UL 94 Class Plate thickness | | | | | | | | | | | |
| 1.6 mm | HB | V-0 | V-0 | HB | V-0 | V-0 | HB | V-0 | — | — | — |
| 3.2 mm | HB | V-0 | V-0 | HB | V-0 | V-0 | HB | V-0 | — | — | — |
| Bleeding tests | | | | | | | | | | | |
| 14 Days 80° C. Weight loss % | — | 3.0 | 1.5 | — | 0 | 0 | — | 2.1 | — | 20.1 | 3.5 |

TABLE-continued

|  | ABS (A) | | HIPS (B) | | PTMT (C) | | HDPE (D) | |
|---|---|---|---|---|---|---|---|---|
| 14 Days 50° C. 100% rel. hum. | | | | | | | | |
| Weight loss % | — | 1.0 0.5 | — | 0 0 | — | 0 | — | 5.6 1.9 |
| Coating | | None Light | | None None | | None | | Thick None |

The weight loss is based on the amount of flame retardant utilized.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. Tetrabromophthalic acid esters of pentabromobenzyl alcohol with a softening temperature of 270°–280° C. and a bromine content of 73–77% by weight.

2. Tetrabromophthalic acid esters of tetrakis(-bromomethyl)-o-xylylene glycol with a softening temperature of 220°–230° C. and a bromine content of 62–68% by weight.

3. Esters of claim 1 with a bromine content of about 75% by weight.

4. Esters of claim 2 with a bromine content of about 67% by weight.

5. A flame retardant composition comprising a thermoplastic synthetic resin and an amount of the esters of claim 1 or 2 effective as a flame retardant.

6. The flame retardant composition of claim 5 wherein the amount of esters is 5–20% by weight of the total composition.

7. The flame retardant of claim 5 or 6 further comprising an amount of antimony trioxide effective as a flame retardant.

* * * * *